No. 706,107. Patented Aug. 5, 1902.
C. W. PRENTISS.
FRUIT KNIFE.
(Application filed Mar. 1, 1902.)
(No Model.)
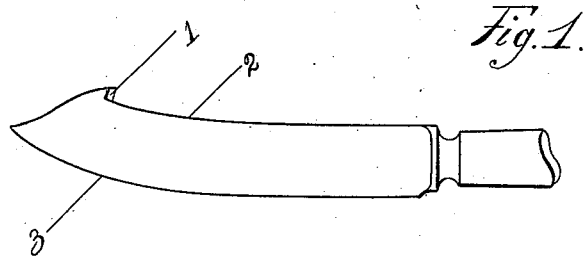
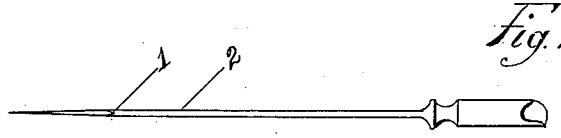
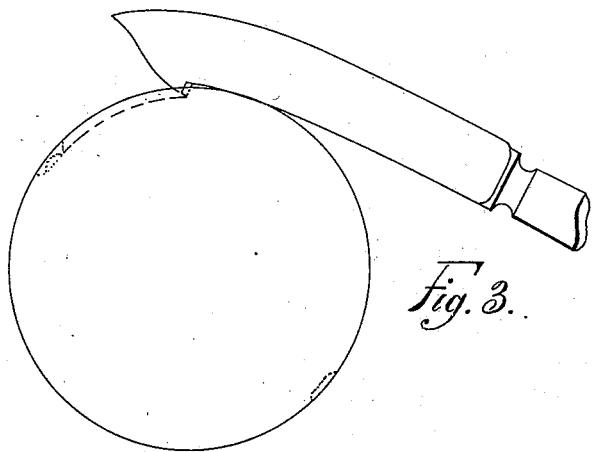
WITNESSES:
Bert Holt.
Archie McNay.
INVENTOR
Charles W. Prentiss
BY
Lucien D. Yeomans
ATTORNEY
THE NORRIS PETERS CO., PHOTO-LITHO., WASHINGTON, D. C.

UNITED STATES PATENT OFFICE.

CHARLES W. PRENTISS, OF ANTRIM, NEW HAMPSHIRE, ASSIGNOR TO GOODELL COMPANY, OF ANTRIM, NEW HAMPSHIRE.

FRUIT-KNIFE.

SPECIFICATION forming part of Letters Patent No. 706,107, dated August 5, 1902.

Application filed March 1, 1902. Serial No. 96,351. (No model.)

*To all whom it may concern:*

Be it known that I, CHARLES W. PRENTISS, a citizen of the United States, residing at Antrim, in the county of Hillsboro and State of New Hampshire, have invented certain new and useful Improvements in Fruit-Knives; and I do hereby declare the following to be a full, clear, and exact description of the invention, such as will enable others skilled in the art to which it appertains to make and use the same.

This invention relates to a fruit-knife for especial use in removing the peel from oranges, grape-fruit, lemons, or the like, and has for its object to facilitate the quartering or dividing the peel of the fruit in sections without gashing the pulp of the fruit preparatory to its removal.

This invention consists in establishing upon the forward end of the back of the blade a short cutting edge facing the handle and perpendicular to the back edge of the blade, substantially as hereinafter described, and pointed out in the claim.

Referring to the drawings, Figure 1 is a side elevation, and Fig. 2 is a back edge view. Fig. 3 shows the position the parting edge assumes when properly held in the hand of the operator.

In the drawings, in which like numerals of reference refer to like parts, 1 is the short cutting edge established upon the back of the blade and facing the handle.

2 is the blunt back edge of the knife, preferably of a slightly-curved outline, extending from the bolster to the parting edge.

3 is the cutting edge of the knife, of any suitable, usual, or desirable form.

In using the knife, the fruit being held in one hand, the operator divides the peel by drawing the short parting edge 1 through meridian lines upon the surface of the fruit while holding the knife in the other hand and with its cutting edge 3 away from the fruit. In this operation the slightly-curved blunt back of the blade 2 acts as a guide and depth-gage for the parting edge and prevents gashing the pulp of the fruit. The peel of the fruit having been thus sectioned by the parting edge 1 may be removed in the usual manner by reversing the position of the blade, as in an ordinary fruit-knife.

In the drawings I have shown the knife with a solid metal handle; but it may be made equally efficient with a handle composed of thin plates or scales fastened to a median strip, an extension of the blade, or with a solid handle of other than metal composition attached to the blade in any desirable manner.

It is evident that changes in the form and proportion of the parts herein shown as essential features of my invention may be made without departing from the spirit or sacrificing the advantages, and I therefore reserve the right to make such changes as fairly fall within the scope of my invention.

Having thus fully described my invention, what I claim as new, and desire to secure by Letters Patent, is—

A fruit-knife having a curved cutting front edge, and a curved blunt back edge, and a sharp point, and having on the blunt edge, near the point, a short sharpened parting-blade at an angle with the blunt back, and lying in the same plane with the blade proper, substantially as described.

In testimony whereof I affix my signature in the presence of two witnesses.

CHAS. W. PRENTISS.

Witnesses:
H. A. HURLIN,
MARY J. ABBOTT.